US012716741B2

(12) United States Patent
Harmon et al.

(10) Patent No.: US 12,716,741 B2
(45) Date of Patent: Aug. 25, 2026

(54) SYSTEMS AND METHODS FOR PRIORITY-AWARE EMERGENCY EVENT NOTIFICATION

(71) Applicant: AT&T Intellectual Property I, L.P., Atlanta, GA (US)

(72) Inventors: Jacob Harmon, Dallas, TX (US); Emila Lopez, Waxahachie, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 41 days.

(21) Appl. No.: 18/632,855

(22) Filed: Apr. 11, 2024

(65) Prior Publication Data

US 2025/0321118 A1 Oct. 16, 2025

(51) Int. Cl.

| | |
|---|---|
| ***B60Q 1/00*** | (2006.01) |
| ***G01C 21/36*** | (2006.01) |
| ***G08G 1/0967*** | (2006.01) |
| ***H04W 4/90*** | (2018.01) |

(52) U.S. Cl.

CPC ....... *G01C 21/3694* (2013.01); *G08G 1/0967* (2013.01); *H04W 4/90* (2018.02)

(58) Field of Classification Search

CPC ............. G01C 21/3694; G08G 1/0967; G08G 1/0965; H04W 4/90; H04W 4/023; H04W 4/024; H04W 4/029

USPC ....................................................... 340/425.5

See application file for complete search history.

(56) References Cited

U.S. PATENT DOCUMENTS 7,327,280 B2 * 2/2008 Bachelder .............. G08G 1/095 340/902
8,610,596 B2 * 12/2013 Johnson ................. G08G 1/081 340/902
8,666,357 B2 * 3/2014 Petite ...................... H04W 4/12 379/39
12,087,161 B1 * 9/2024 Deyaf .................. G08G 1/0965
2009/0264094 A1 * 10/2009 Smith ................... H04W 76/50 455/466
2011/0018736 A1 * 1/2011 Carr ..................... G08G 1/0965 340/902
2015/0243165 A1 * 8/2015 Elsheemy ........ G08G 1/096775 340/906

* cited by examiner

*Primary Examiner* — Tai T Nguyen
(74) *Attorney, Agent, or Firm* — Guntin & Gust, PLC; Bryan S. Latham

(57) ABSTRACT

Aspects of the subject disclosure may include, for example, providing prioritized mobile network services to priority user equipment associated with emergency events, where the prioritized mobile network services comprise a reserved network capacity and high threshold bandwidth and are limited to an authenticated group of users; providing subscription based mobile network services to subscriber user equipment, where the subscription based mobile network services enable the subscriber user equipment to receive real time information associated with the emergency events from the priority user equipment; upon receiving the real time information, determining a distance to the subscriber user equipment and a moving location approaching the subscriber user equipment; and based on the moving direction approaching the subscriber user equipment, generating a near real time output via a user interface. Other embodiments are disclosed.

20 Claims, 11 Drawing Sheets

200

FIG. 2E
SW
7:01
LTE
800
ft
Take exit for
MI-14
7:23
ETA
23
min
19.4
mi
Jessica Park
now
iMessage
MI-14 W
I-275 S

295

298

300

SYSTEMS AND METHODS FOR PRIORITY-AWARE EMERGENCY EVENT NOTIFICATION

FIELD OF THE DISCLOSURE

The subject disclosure relates to near real time driver alert systems and methods for alerting drivers of real time events with relevant information to trigger and facilitate an advance driver action.

BACKGROUND

Emergency vehicle related incidents are common with thousands of accidents happening yearly. These accidents can be fatal, cause injuries, and lead to extreme traffic delays. For emergency vehicles moving on the road, a response time is a huge factor in the safety and survival of patients, first responders, drivers nearby, etc. For instance, an ambulance getting a patient having critical health conditions to a hospital even with a few minutes delay may have huge impacts on their chance of survival. The golden hour is a period of time immediately after an injury or medical events that will highly likely prevent death when prompt medical treatment is provided. For medical events such as a heart stop, respiration stop, massive bleeding, etc., the golden hour can be less than 10 minutes. A police officer reaching the scene of a violent crime even seconds sooner can make a huge difference in the outcome.

BRIEF DESCRIPTION OF THE DRAWINGS

Reference will now be made to the accompanying drawings, which are not necessarily drawn to scale, and wherein.

DETAILED DESCRIPTION

Figure 1:
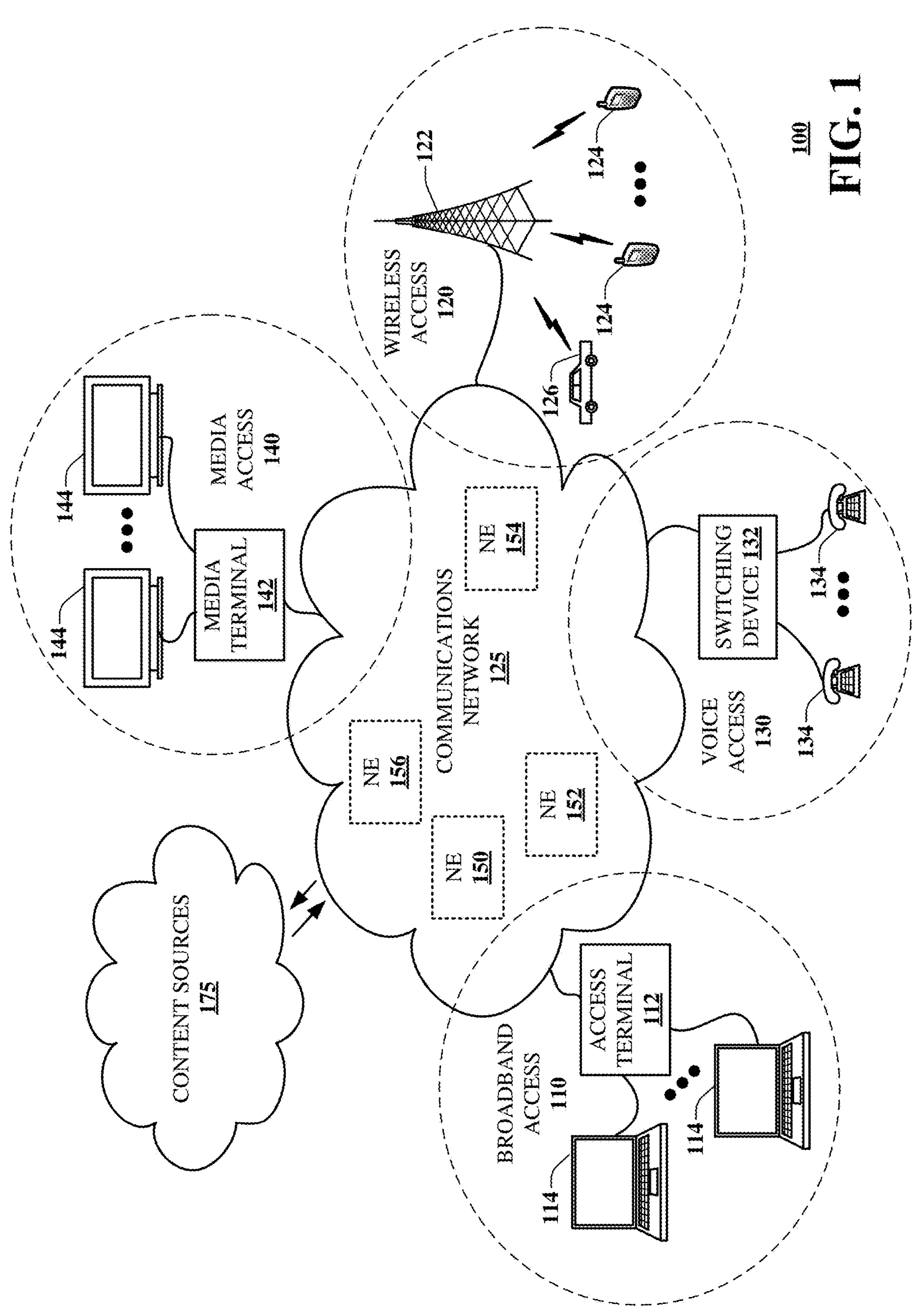
FIG. 1 is a block diagram illustrating an exemplary, non-limiting embodiment of a communications network in accordance with various aspects described herein.

The subject disclosure describes, among other things, illustrative embodiments for near real time driver alert systems and methods for notifying drivers of real time events such as emergency events to trigger and facilitate an advance driver action. As one example, the near real time driver alert systems and methods operate to alert a presence and approaching directions of emergency vehicles with respect to nearby vehicles or other user devices. Other embodiments are described in the subject disclosure.

One or more aspects of the subject disclosure are directed to a device including a processing system including a processor, and a memory that stores executable instructions that, when executed by the processing system, facilitate performance of operations. The operations include receiving a GPS signal representing a geographical location of a target entity; determining that the geographical location of the target entity is within a predetermined threshold distance to a reference point; upon determination of proximity within the predetermined threshold distance to the reference point, determining a moving direction of the target entity relative to the reference point, where the moving distance varies as the target entity, the reference point or both move; and generating, on a user interface, an output indicative of the target entity and the moving direction and the geographical location of the target entity with respect to the reference point.

One or more aspects of the subject disclosure are directed to a non-transitory machine-readable medium, comprising executable instructions that, when executed by a processing system including a processor, facilitate performance of operations. The operations include providing prioritized mobile network services to priority user equipment associated with emergency events, wherein the prioritized mobile network services comprise a reserved network capacity and high threshold bandwidth and are limited to an authenticated group of users; providing subscription based mobile network services to subscriber user equipment, wherein the subscription based mobile network services enable the subscriber user equipment to receive real time information associated with the emergency events from the priority user equipment; upon receiving the real time information, identifying a type of the priority user equipment and determining a distance to the subscriber user equipment and a direction approaching the subscriber user equipment; and based on the type of the priority user equipment and the direction approaching the subscriber user equipment, generating a near real time output via a user interface.

One or more aspects of the subject disclosure are directed to a method including providing, by a processing system including a processor, prioritized mobile network services to priority user equipment associated with emergency events, wherein the prioritized mobile network services comprise a reserved network capacity and high threshold bandwidth and are limited to an authenticated group of users; providing, by the processing system, non-prioritized mobile network services to subscriber user equipment, wherein the non-prioritized mobile network services enable the subscriber user equipment to receive real time information associated with the emergency events from the priority user equipment; upon receiving the real time information, identifying, by the processing system, a type of the priority user equipment and determining a distance to the subscriber user equipment and a moving direction approaching the subscriber user equipment; and based on the type of the priority user equipment and the moving direction approaching the subscriber user equipment, generating a near real time output via a user interface.

Referring now to FIG. 1, a block diagram is shown illustrating an example, non-limiting embodiment of a system 100 in accordance with various aspects described herein. For example, system 100 can facilitate in whole or in part systems and methods for notifying drivers of real time events such as emergency events to trigger and facilitate an advance driver action. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
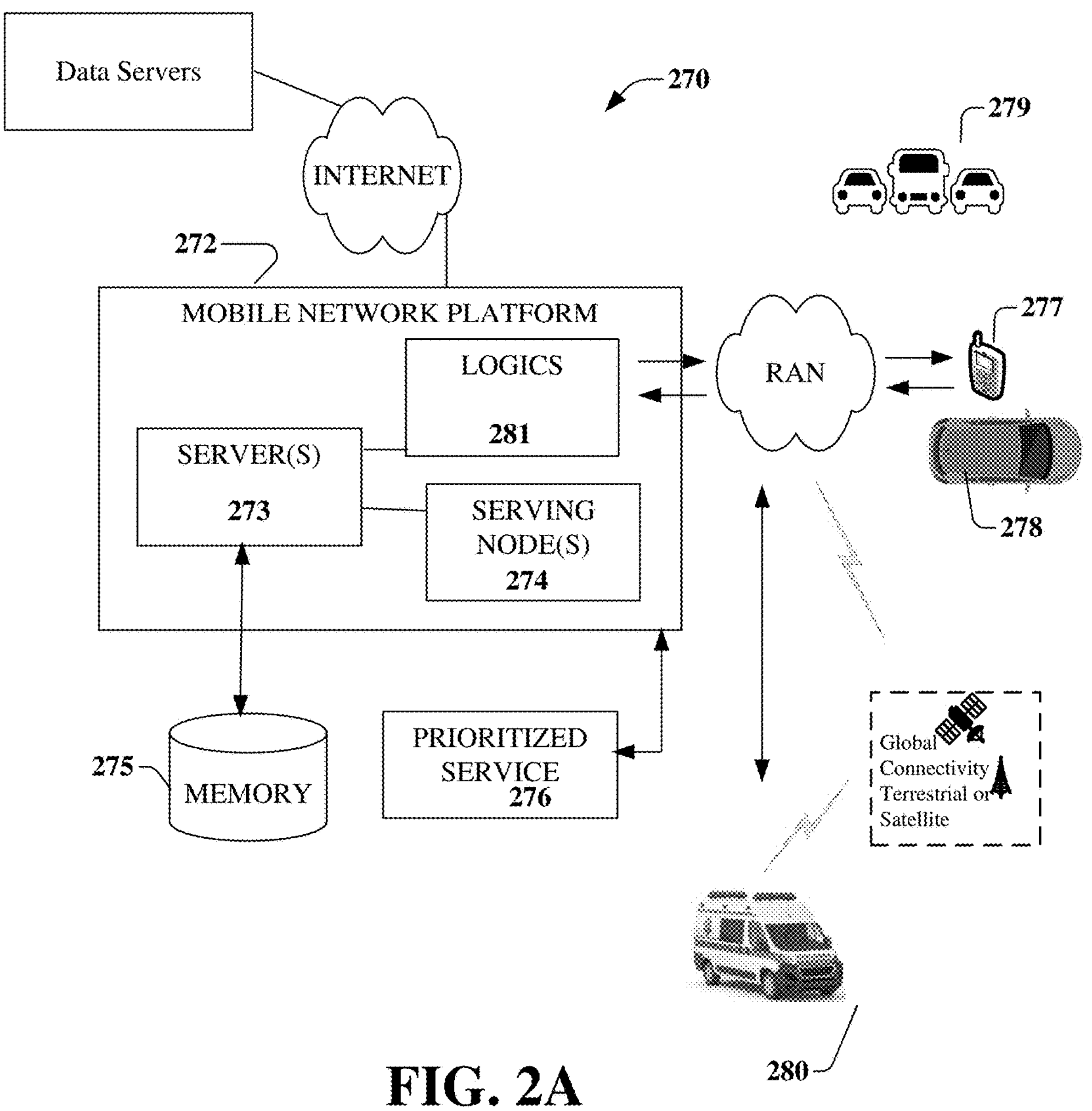
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a near real time driver alert system 270 functioning within the communication network of FIG. 1 in accordance with various aspects described herein. The near real time driver alert system 270 is configured to identify real time events such as emergency events and notify nearby drivers to trigger and facilitate advance actions by drivers.

In various embodiments, the near real time driver alert system 270 includes various user devices 277, 278 and 279. For instance, user devices 277, 278 and 279 include mobile devices, connected vehicles, unmanned aerial vehicles, etc. The user devices 277, 278 and 279 are connected to the internet via a RAN 520 and a mobile network platform 272. The mobile network platform 272 includes server(s) 273 connected to serving node(s) 274. The serving node(s) 274 may support and facilitate a prioritized service 276 which serve a priority group of user equipment operated by a priority class of users such as first responders, law enforcement officers, fire fighters, etc. The mobile network platform 272 further includes logics 281 that implements functions and services of the near real time alert system 270. In some embodiments, the logic 281 includes a processing system including a processor, and a memory that stores executable instructions that, when executed by the processing system, facilitate performance of operations facilitating the near real time driver alert system 270. A memory 275 includes instructions that are executed by the server(s) 273 that facilitate wireless communication services and functions.

The near real time driver alert system 270 includes various use cases. For instance, the user device 278 corresponds to a connected car driving on a highway and an emergency vehicle 280 such as an ambulance or a police car is approaching the user device. In many situations, the user device may not have a direct view or have no visibility to the emergency vehicle 280. A driver operating the user device 278 is trying to yield to the emergency vehicle 280 and takes a necessary action to clear the way for the emergency vehicle 280 or select a different route. However, without sufficient visibility, a driver of the user device 278 is unable to determine how to take the necessary action. Sound from the emergency vehicle may not clearly indicate an approaching direction of the emergency vehicle with respect to the user device, e.g., whether the emergency vehicle is approaching from a front direction or behind from the user device. The user device, the emergency vehicle or both are moving fast on a highway and a small amount of delay time can potentially impact the user device, the emergency vehicle or both and exacerbate emergency events. As another example, police alerts or road hazards such as construction sites, occurring in real time, can be notified to drivers along with relevant information, such as an approaching direction or proximity to drivers. As further another example, emergency events notified to a group of drivers or users can be transmitted or propagated to another group of drivers or users under predetermined conditions, a service agreement, a subscription agreement, etc. Advance alerts can trigger and facilitate actions by drivers or users, for example, preparing to yield to emergency vehicles, selecting different routes to avoid the area having real time emergency events, etc.

In various embodiments, emergency vehicles 280 are connected to the wireless communication network and the internet via the RAN 520 and the mobile network platform 272. The emergency vehicles 280 are connected via satellite connections, in addition to terrestrial connections. The emergency vehicles 280 can be connected to the wireless communication using a network resource dedicated to prioritized services 276, as described in detail below in connection with FIG. 2B. The emergency vehicles 280 include GPS receivers that access position information via a satellite-based radio navigation system. The GPS signal is generated without transmitting data by a user and independently of any telephonic or internet reception. Using GPS receivers installed therein, the emergency vehicles 280 can obtain geographical location information. The emergency vehicles 280 may activate or deactivate transmission of GPS signals to transmit or block the transmission of the position information as needed.

In various embodiments, the emergency vehicles 280 are in communication with the user devices 277, 278 and 279 to provide a notification or an alert of real time emergency events. In this case, the emergency vehicles 280 may activate transmission of a certain set of information such as the GPS signals, police alert messages, or any other configurable information. For instance, using the GPS signals, the emergency vehicles 280 can provide their geographical location information to the user devices 277, 278 and 279. The user devices 277, 278 and 279 may determine proximity to the emergency vehicles 280 and moving directions of the emergency vehicles 280 relative to the user devices 277, 278 and 279 as a reference point. In other words, the user devices 277, 278 and 279 may determine whether the emergency vehicles 280 are approaching to or moving away from the user devices 277, 278 and 279 when the emergency vehicles 280 are within a predetermined proximity distance to the user devices 277, 278 and 279. Additionally, or alternatively, the user devices 277, 278 and 279 may determine or receive a notification of whether the emergency vehicle has passed by. In case where the user devices 277, 278 and 279 have no visibility of the emergency vehicles 280 and certain audible sound lingers, it is useful for the user devices 277, 278 and 279 to appreciate that the emergency events remain active or not. Additionally, or alternatively, the emergency vehicles 280 may be configured to transmit the GPS signals to a predetermined proximity distance, such as 2-3 miles by way of example. In addition, information from the emergency vehicles 280 can be received at an authenticated group of user devices, including subscriber user equipment, for example.

In various embodiments, distance sensing techniques available in the relevant technical field can be used to determine the proximity between the emergency vehicles 280 and the user devices 277, 278 and 279. As one example, lidar determines ranges by targeting an object or a surface with a laser and measuring the time during which the laser light is reflected and returned back to a receiver. In some embodiments, lidar and associated system may be installed with the emergency vehicles 280, the user devices 277, 278 and 279, or both. Additionally, the lidar and associated system can detect a direction from which the reflected light is returned. This may facilitate a determination of both the distance to and a moving direction of the emergency vehicles 280 together. As other examples, other devices using infrared light, ultrasonic waves, lasers, radars, etc. can be used. For instance, radar sensors may enable cars to see objects or items that are out of line of sight of the user devices 277, 278 and 279. Additionally, radar sensors can be implemented to be alerted when an emergency vehicle has its radar sensor and associated systems running. As another example, GPS signals of the emergency vehicles 280 and the user devices 277, 278 and 279 can be compared and the distance therebetween and a positioning of the emergency vehicles 280 and the user devices 277, 278 and 279 can be computed and determined.

In various embodiments, the user devices 277, 278 and 279 include siren sensors that can sense and listen for sirens from the emergency vehicles 280 and notify drivers. The user devices 277, 278 and 279 include a processing system that receives sound from the siren sensors and determine proximity to a source of sound. In addition, the siren sensors can supplement the distance sensing techniques described above in order to determine the moving direction and the proximity of the emergency vehicles 280 with respect to the user devices 277, 278 and 279.

In various embodiments, the emergency vehicles 280 correspond to priority user equipment which qualify to use prioritized mobile network services. The prioritized mobile network services include a reserved network capacity and high threshold bandwidth, among other things. Additionally, the prioritized mobile network services can be associated with an authenticated group of users such as fire fighters, police officers, first responders, etc. The user devices 277, 278 and 279 may correspond to subscriber user equipment where users of the user devices 277, 278 and 279 have been subscribed to services that receive real time event information such as an ambulance approaching behind in 2 miles on a highway. Extent and formats of real time information exchanged between the priority mobile network services and the subscription based mobile network services can be configured based on a service agreement and/or a subscriber agreement as one example. In addition, the extent and formats of the real time information may change based on various parameters, e.g., device configurations and capabilities, as another example.

Figure 2B:
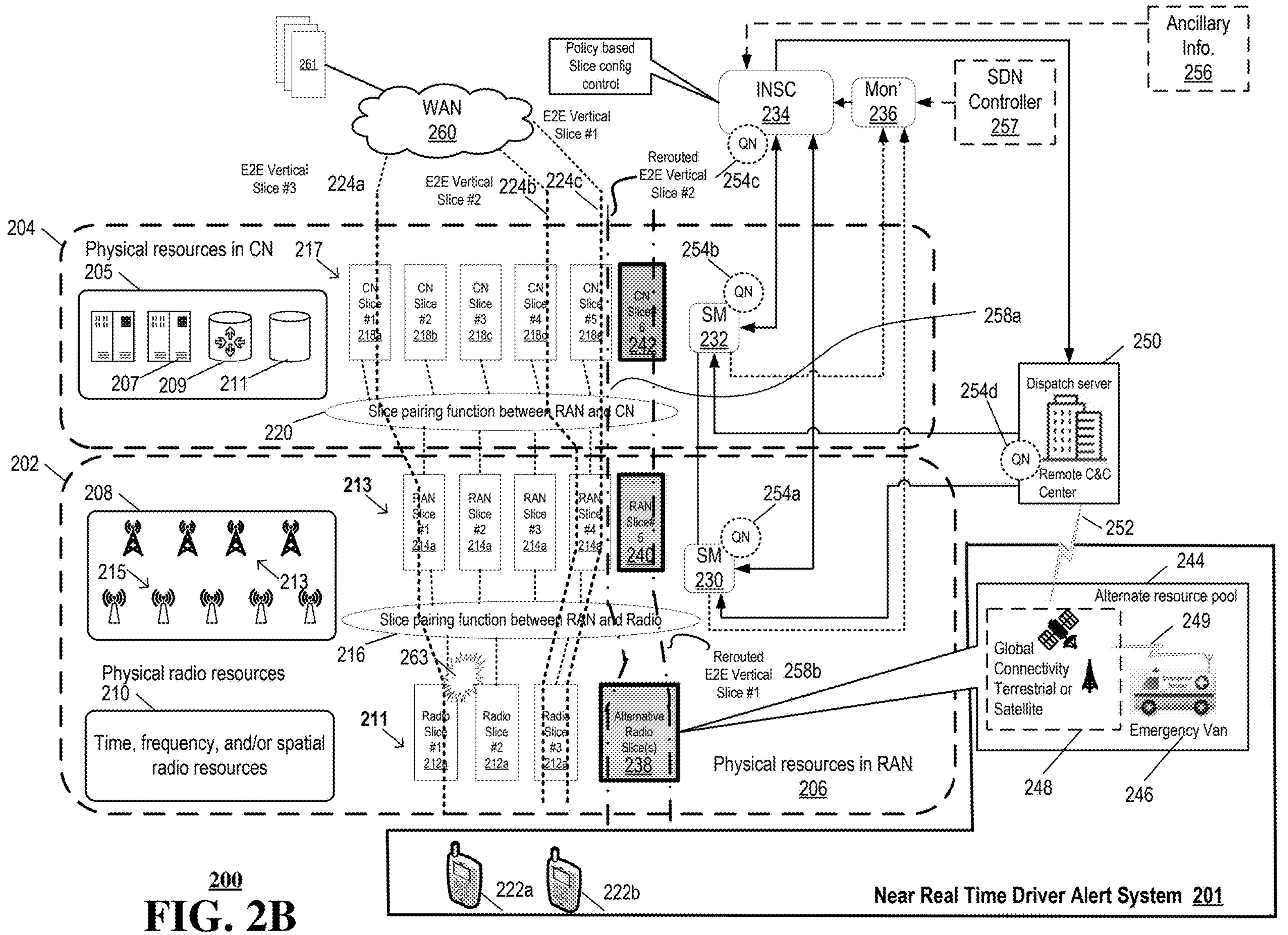
FIG. 2B is a block diagram illustrating an example, non-limiting embodiment of a system providing priority services.

FIG. 2B is a block diagram illustrating an example, non-limiting embodiment of a system 200 providing prioritized mobile network services to priority user equipment. The system 200 includes a near real time driver alert system 201 which is implemented and operates as described above in connection with FIG. 2A. The near real time driver alert system 201 includes user devices 222*a*, 222*b* and emergency vehicles 246 by way of example only. The near real time driver alert system 201 may include other types of user devices and other types of emergency vehicles. Additionally, the near real time alert system 210 may further include other types of emergency events such as construction sites, hazardous zones, accident sites, etc. and prioritized mobile network services may be provided to user devices associated with the emergency events. For instance, mobile devices or vehicles of construction managers or staffs may be assigned with prioritized mobile network services to broadcast or transmit location information and other information relevant to construction sites in order to trigger drivers or pedestrians to avoid construction sites or have a notice or knowledge about construction sites.

Impacts to network operations that might otherwise compromise network access to a priority class of users, e.g., first responders, are adapted to preserve and/or otherwise restore the network access. Accordingly, a reserved network capacity and/or level of service may be maintained for the prioritized mobile network services. A networking architecture that incorporates network "slicing" can be incorporated for the prioritized mobile network services. FIG. 2B depicts an access network 202 including radio access network (RAN) and a core network 204. The system 200 orchestrates at least some end-to-end network paths that extend between end user devices, such as mobile phones, tablet devices, laptops, etc., referred to generally as user devices 222*a*, 222*b*, and a network accessible service. The system 200 further includes one or more back-end servers 261, which may be accessible via direct connections to the core network 204 and/or via indirection connections through one or more other network paths, e.g., via a wide area network (WAN) 260, such as the Internet. In particular, a first end-to-end network path 224*a* extends between a first user device 222*a* and one or more of the back-end servers 261, e.g., via the WAN 260. Likewise, second and third end-to-end network paths 224*b*, 224*c*, extend between a second user device 222*b* and the back-end servers 261 via the WAN 260.

According to the illustrative example, the second user device 222*b* may be associated with a priority class of users, such as first responder, whereas the first user device 222*a* may not be associated with the special class of users. It is envisioned that, without limitation, user classes may be distinguished by one or more of a subscription level, a user association, e.g., with a business and/or governmental agency, a type of user device, a QoS, a user device location. Accordingly, such classes may be defined and/or otherwise managed by a network service provider. In at least some instances, membership in and/or association of a user device with a priority class of users may require independent authorization. For example, identification of a user and/or user device with a first responder class of priority users may require authorization from an independent agency, such as the Department of Homeland Security.

Identification of a user device with a priority class may require a user authentication process. Such processes may include, without limitation, a registration and/or entry of user credentials. Credentials may include any form, such as username and password, security token, code or key, biometric identification, e.g., facial recognition, voice recognition, fingerprint, and the like. In at least some embodiments, the system 200 may identify user equipment, e.g., the user devices 222*a*, 222*b*, generally 222, by a unique equipment identifier, such as the International Mobile Equipment Identity (IMEI) that uniquely identifies a device, and/or an International Mobile Subscriber Identification number (IMSI) that uniquely identifies a user, e.g., via a subscriber identity module (SIM) card and/or an Integrated Circuit Card ID (ICCID), a globally unique serial number—a one-of-a-kind signature that identifies the SIM card itself. Alternatively, or in addition, identifiers for the purpose of identifying a class of service may include In at least some embodiments, physical RAN resources 206 may include and/or otherwise support logical RAN instances. According to the illustrative example, the physical RAN resources 206 support a first group of radio slices 211. The first group of radio slices 211 includes a first radio slice 212*a*, a second radio slice 212*b*, and a third radio slice 212*c*. The radio slices 212*a*, 212*b*, 212*c*, generally 212, may be adapted for wireless transmission and/or reception. The physical RAN resources 206 may further include a second group of RAN slices 213. The second group of RAN slices 213 includes a first RAN 214*a*, a second RAN slice 214*b*, a third RAN slice 214*c*, and a fourth RAN slice 214*d*. The RAN slices 214*a*, 214*b*, 214*c*, 214*d*, generally 214, may be adapted for wireless transmission and/or reception. In at least some embodiments, the RAN slices 214 are configured as radio controllers to be used in combination with the radio slices 212.

The example physical RAN resources 206 support a first slice pairing function 216. The first slice pairing function 216 is adapted to pair one or more of the logical RAN slices 214 with one or more of the logical radio slices 212. Such RAN-radio pairing may be managed according to one or more of demand, application and/or network service type, class of service, QoS, end user equipment capability and so on. It is envisioned that one or more of the physical RAN resources 206, including one or more of the radio slices 212, the RAN slices 214 and/or the first slice pairing function 216 may be managed by a network controller.

In at least some embodiments, the physical core network resources 205 may include and/or otherwise support logical core network instances. According to the illustrative example, the physical core network resources 205 supports a group of core network slices 217. The group of core network slices 217 includes a first core network slice 2182*a*, a second core network slice 218*b*, and a third core network slice 218*c*, a fourth core network slice 218*d*, and a fifth core network slice 218*e*. The core network slices 218*a*, 218*b*, 218*c*, 218*d*, 218*e*, generally 218, may be adapted for performing respective core network functions. For example, the core network slices 218 may be adapted to operate according to one or more definable mobile network core functions, e.g., according to 4G, LTE, LTE-Advanced, 5G, and/or 6G.

The example physical core network resources 205 support a second slice pairing function 220. The second slice pairing function 220 is adapted to pair one or more of the core network slices 218 with one or more of the logical RAN slices 214. Such core network-RAN pairing may be managed according to one or more of demand, application and/or network service type, class of service, QoS, end user equipment capability, and so on. It is envisioned one or more of the physical core network resources 205, including one or more of the core network slices 218 and/or the second slice pairing function 220 may be managed by a network controller.

The system 200 is configured to provide three examples of end-to-end paths. A first end-to-end path 224*a* is referred to as a first end-to-end, vertical path, as it traverses different network domains. Namely, the first end-to-end path 224*a* supports a first corresponding network service that extends between the first user device 222*a* and a corresponding one of the back-end servers 261. Likewise, the second and third end-to-end paths 224*b*, 224*c* supports a second and third corresponding network services that extend between the second user device 222*b* and corresponding ones of the back-end servers 261. Each of the end-to-end, vertical paths 224*a*, 224*b*, 224*c*, generally 224, traverses each of the access network 202 and the core network 204. The system 200 may include a SDN controller 257, shown in phantom. The system 200 further provides a network monitor 236 and an intelligent network configuration controller 234.

In various embodiments, the access network 202 has suffered an adverse event 263 that has rendered all slices 212 of the group of radio slices 211 inoperable. For example, the physical RAN resources supporting the group of radio slices 211 may have been damaged, e.g., as a result of a storm or a fire. Perhaps a power cable providing primary and backup power have been severed, e.g., by a wild animal. In any event, there remain no available orchestrated radio slices 212, nor can any additional radio slices 212 be orchestrated and/or otherwise instantiated at this location due to the physical damage. Consequently, the end-to-end, vertical paths 224 have been compromised, such any active services and/or reserved network capacity associated with the end-to-end, vertical paths 224 are no longer available.

In at least some embodiments, the network service provider may identify alternative radio resources 238 that may be utilized to provide the compromised functionality and to allow at least some of the network services, and particularly those associated with any special classes of users, such as first responders, to be restored. The restoration may be permanent but is more likely temporary until network repairs to any compromised equipment may be made to restore full and normal network operation. According to the illustrative example, the alternative radio resources 238 may include deployable radio equipment that may be transported to a suitable location to restore at least a portion of the compromised wireless network service. By way of nonlimiting example, deployable resources, e.g., from a pool of such deployable resources 244, may include radio equipment deployed on a vehicle 246. Other examples include radio equipment deployable on a drone, e.g., an aerial platform that may be deployed in an airborne manner to provide wireless coverage sufficient to restore at least a portion of the compromised wireless network service. Still other alternatives may include cell on a palette, in which a pallet or group of pallets may be deployed to a suitable location by truck and/or aerial drop.

In at least some embodiments, the alternative radio resources 238, such as the mobile van may be connected to and/or otherwise integrated into any existing physical RAN resources 206 that may remain operational. According to the illustrative example, the group of RAN slices 213 and the first slice pairing function remain operational, such that the alternative radio resources 238 may be interconnected. In at least some embodiments, the deployed vehicle 246 is in communication with a transport network 248, such as a satellite network and/or a terrestrial radio network and/or a cabled packet switched network and/or an optical network. In more detail, the system 200 may include and/or otherwise be in communication with a remote command and control center 250. For example, the deployed vehicle 246 may be in communication with the transport network 248 via a local radio link 249, and/or a cabled or wired link, depending upon distances between the deployed vehicle 246 and the transport network 248.

Figure 2C:
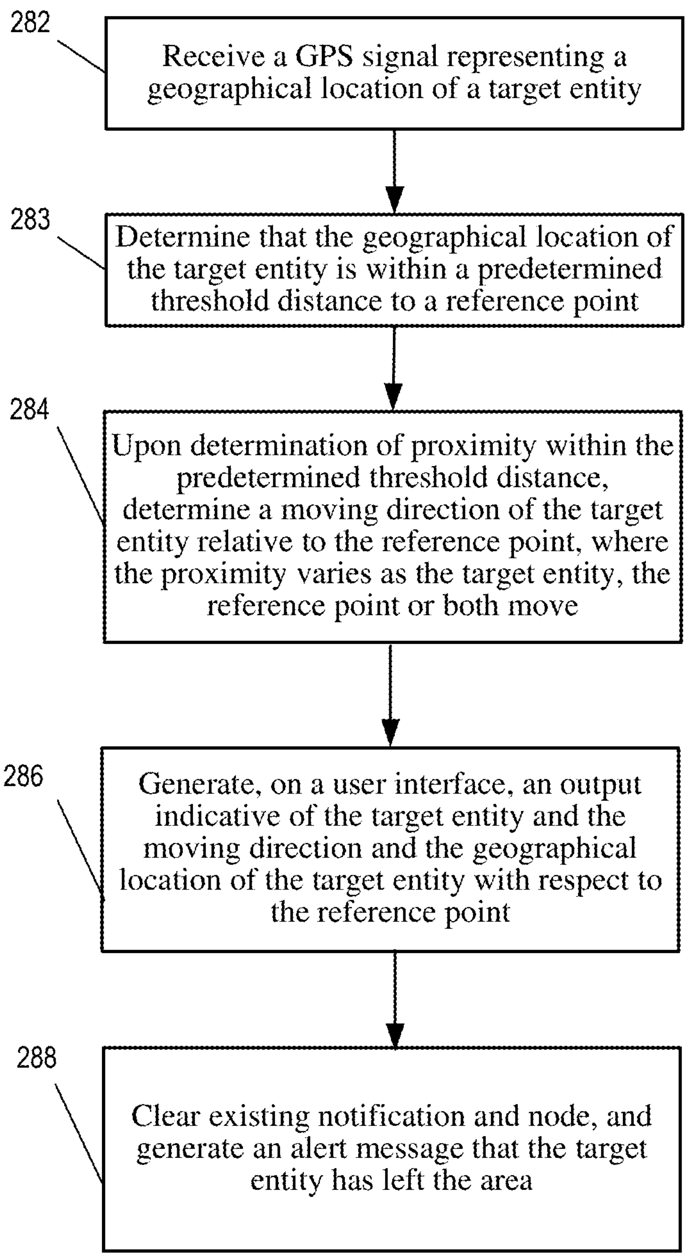
FIG. 2C depicts an illustrative embodiment of a method in accordance with various aspects described herein.

FIG. 2C depicts an illustrative embodiment of a method 281 in accordance with various aspects described herein. In various embodiments, the method 281 includes receiving a GPS signal representing a geographical location of a target entity (Step 282). In order to transmit the GPS signal, the target entity may activate relevant systems and associated circuitries. If and when needed, the target entity may deactivate relevant systems and associated circuitries to terminate or block transmission of the GPS signal. For instance, the target entity may include a law enforcement vehicle and need to block a transmission of the GPS signal for facilitating law enforcement activities or a privacy concern. As another example, a user device corresponds to a connected car driving on a highway and an emergency vehicle such as an ambulance or a police car, which is the target entity, is approaching towards the user device. In some situations, the user device may not have a direct view or have no visibility to the target entity. A driver operating the user device is trying to be responsive to the emergency vehicle and takes a necessary action to clear the way for the emergency vehicle. However, without sufficient visibility, the user device may be unable to determine how to take the necessary action. In many cases, sound from the emergency vehicle may not indicate whether the emergency vehicle is approaching from a front direction or behind from the user device. The user device, the emergency vehicle or both are moving fast on a highway and a small amount of delay time may impact the user device, the emergency vehicle or both.

The method 281 further includes determining that the geographical location of the target entity is within a predetermined threshold distance to a reference point (Step 283). Using the above example, the emergency vehicle approaches towards the user device and the method 281 determines that a distance between the emergency vehicle and the user device is within a predetermined threshold distance. The predetermined threshold distance is set to a default value such as 2 miles by way of example. The predetermined threshold distance is a configurable parameter to reflect environments such as a crowded city, a remote town with a low or almost no traffic, a particular time of a day, weather conditions, a highway or a local road, etc. Additionally, or alternatively, the emergency vehicle may be configured to transmit the GPS signal within the predetermined threshold distance. The emergency vehicle may activate a system that transmits the GPS signal upon request, or once the emergency vehicle starts a dispatch motion, transmit the GPS signal periodically (e.g., every few seconds).

In various embodiments, the target entity consistently transmits the GPS signal to nearby vehicles including the user device within a preset boundary. Additionally, or alternatively, the target entity may operate based on a subscription and transmit the GPS signal to nearby vehicles that are determined to be subscribers. In other embodiments, the target entity may transmit the GPS signal to nearby vehicles that are determined to be authenticated or authorized in advance by a receiving system thereof.

Upon determination of proximity within the predetermined threshold distance to the reference point, i.e., a position or location of the user device, the method 281 further includes determining a moving direction of the target entity relative to the reference point (Step 284). The proximity varies as the target entity, the reference point or both move (Step 284).

In various embodiments, currently available distance sensing techniques can be used to determine the distance. As one example, lidar determines ranges by targeting an object or a surface with a laser and measuring the time during which the laser light is reflected and returned back to a receiver. In some embodiments, lidar and associated system may be installed with the target entity, the user device, or both. Additionally, the lidar and associated system can detect a direction from which the reflected light is returned. This may facilitate the distance to and the direction of the target entity to be determined together. As other examples, other devices using infrared light, ultrasonic waves, lasers, radars, etc. can be used. For instance, radar sensors enable cars to see objects or items that are out of cars' line of sight. As another example, GPS signals of the target entity and the reference point can be compared and the distance therebetween and a positioning of the target entity relative to the reference point can be computed and determined.

The method 281 includes generating, on a user interface, an output indicative of the target entity and the moving direction and the geographical location of the target entity with respect to the reference point (Step 286). FIG. 2E depicts an illustrative embodiment of a user interface 295 in accordance with various aspects described herein. As depicted in FIG. 2E, the target entity, such as an ambulance, is approaching the reference point indicative of the user device 295 from a certain direction. FIG. 2F depicts an illustrative embodiment of another user interface 298 in accordance with various aspects described herein. As depicted in FIG. 2F, the user interface 298 illustrates an approaching direction and the distance to the reference point indicative of the user location. For the output purpose, the target entity can be considered as one node and relevant notifications and status are associated with that node.

Additionally, as depicted in FIG. 2F, the user interface 298 includes an audio notification or an audio message describing emergency situations, e.g., "from a left direction, a police car located at the 1.2 mile distance is approaching," "an ambulance, one mile away, is approaching from behind," etc. The user interface 295 can be configured to modify various parameters which define information to be conveyed and notified. For instance, a graphical icon describing different types of emergency vehicles can be presented on the user interface 295, 298. An approaching direction can be configured to be displayed or notified via the audio notification, relative to the reference point, such as "front," "back," "left," "right," etc. Additionally, the distance to the reference point and/or an estimated time to encounter can be displayed or notified via audio means. Further additionally, the user interface 295, 298 may display a recommended action such as "slow down at the speed of xx mph," "pull to the right shoulder in front of your vehicle," as needed and appropriate under the road conditions and relevant physical environments where drivers are in. The method 281 further includes clearing an existing notification and node and generating an alert message on the user interface 295, 298 that the target entity has left the area (Step 288), which signifies the end of emergency events.

Figure 2D:
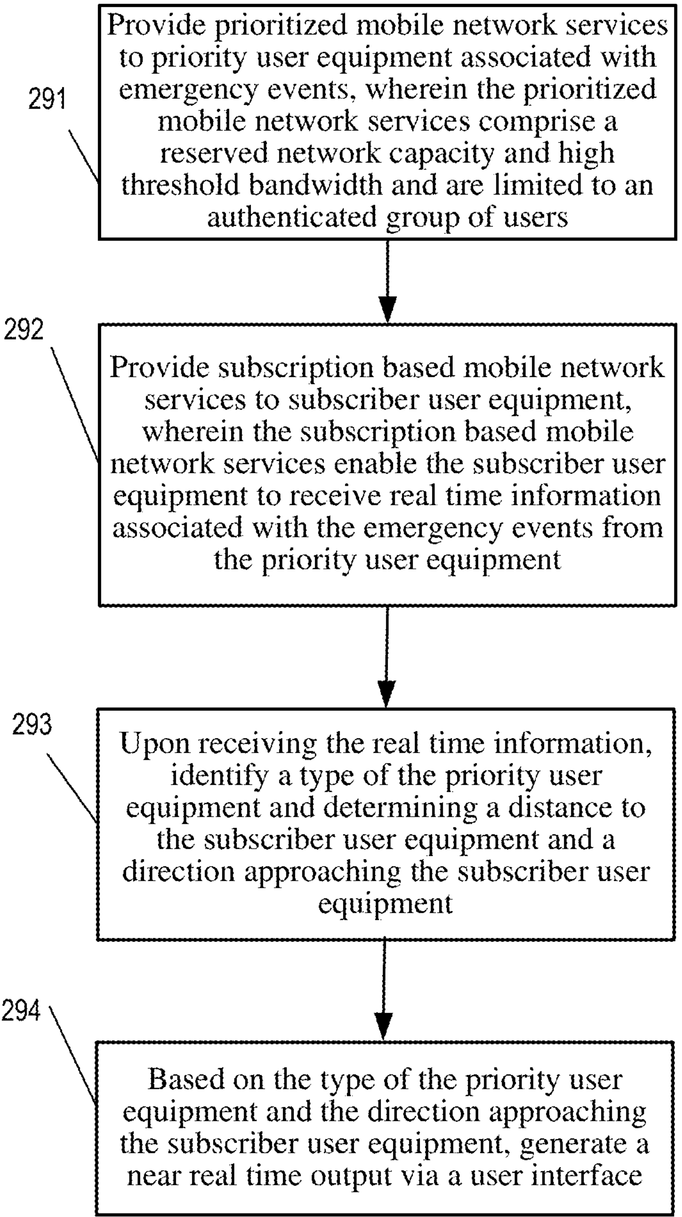
FIG. 2D depicts an illustrative embodiment of a method in accordance with various aspects described herein.
Figure 2E:
FIG. 2E depicts an illustrative embodiment of a user interface in accordance with various aspects described herein.
Figure 2F:
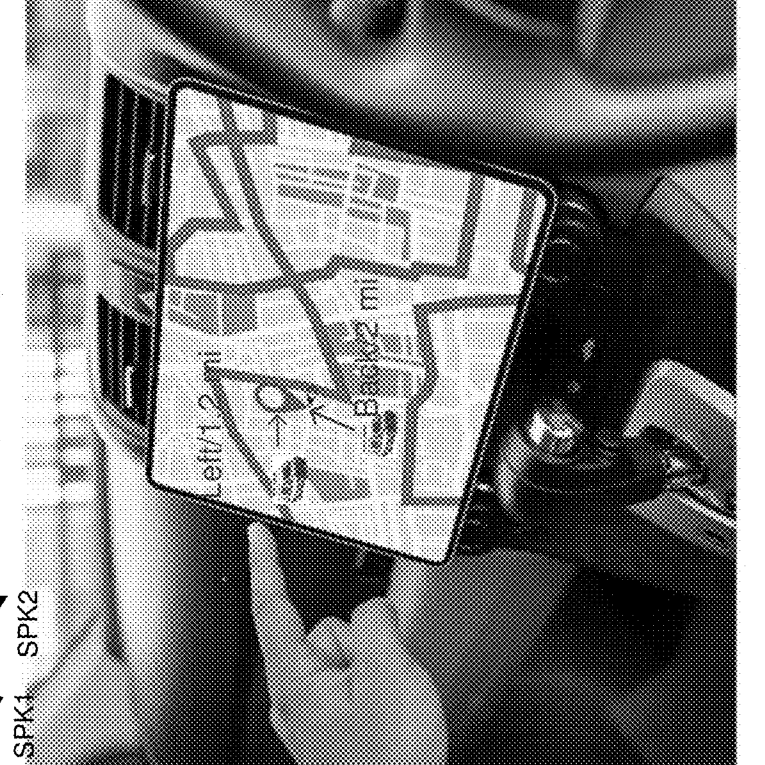
FIG. 2F depicts an illustrative embodiment of another user interface in accordance with various aspects described herein.

FIG. 2D depicts an illustrative embodiment of another method 290 in accordance with various aspects described herein. In various embodiments, the method 290 includes providing prioritized mobile network services to priority user equipment associated with emergency events, where the prioritized mobile network services comprise a reserved network capacity and high threshold bandwidth and are limited to an authenticated group of users (Step 291). As depicted and described in connection with FIG. 2B, priority user equipment may have access and connectivity even for communication outage, problems with a part of the communication network, such as physical damages, etc. As one example, the priority user equipment include emergency vehicles, such as an ambulance, a police car, individuals or entities authorized to be a representative, etc.

The method 290 further includes providing subscription based mobile network services to subscriber user equipment, wherein the subscription based mobile network services enable the subscriber user equipment to receive real time information associated with the emergency events from the priority user equipment (Step 292). As one example, a service provider provides services to drivers to receive and exchange information from the priority user equipment. Drivers can sign up for a subscription and exchange information based on a service subscription agreement. The subscription based services provides added benefit of authenticating drivers and associated vehicles in advance. In other words, access to the information from the priority user equipment by a certain group of users can be used as a proof of authentication of the certain group of users. The subscription based services are limited to subscribed drivers, so information and data exchange can be performed with respect to authenticated subscribers and exposure to malicious individuals or entities can be minimized. In addition, privacy concern, malicious use of emergency events information, etc. can be minimized and addressed. Further additionally, the subscription based services can provide another revenue for the service provider.

The method 290 also includes, upon receiving the real time information, identifying a type of the priority user equipment and determining a distance to the subscriber user equipment and a direction approaching the subscriber user equipment (Step 293). In some embodiments, the priority user equipment may provide identification information along with a position/location information. As described above, the subscription based services can facilitate providing the identification information by presetting or preconfiguring information provided from the priority user equipment to the subscriber user equipment. Additionally, the priority user equipment that is in line of sight with the subscriber user equipment can identify a type of the priority user equipment with a camera sensor or an image sensor by way of example only. Other sensors can be used to sense, capture and identify the priority user equipment.

The method 290 further includes, based on the type of the priority user equipment and the direction approaching the subscriber user equipment, generating a near real time output via a user interface (Step 294). As depicted in FIG. 2E and FIG. 2F, different types of user interfaces including a visual display, an audio message, an audio notification, etc., can be presented to users.

While for purposes of simplicity of explanation, the respective processes are shown and described as a series of blocks in FIGS. 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described in the above embodiments, the systems and methods operate as an advance driver alert system which quickly and conveniently alerts drivers of nearby emergency vehicles using either their mobile devices, or for newer model cars, their car play Android™ auto displays. Using simple GPS checks, the systems and methods will recognize when an emergency responder vehicle is approaching and will notify drivers of nearby vehicles. This will give them ample time to get over and out of the way, leading to safer travels for both the emergency vehicle, and the civilian travelers.

The systems and methods would increase the safety of travels on the road in the presence of an emergency vehicle and would decrease response time for emergency responders. Service providers would have an increase in brand awareness and community support. Community recognition of this initiative would drive customers to support the business that supports their safety.

In various embodiments, the systems and methods can be arranged and positioned in vehicles such as a control department of vehicles. Additionally or alternatively, the systems and methods can be arranged in the mobile network platform (e.g., 272 in FIG. 2A). As one example, the systems and methods can be arranged to include user reporting such as providing users with alerts. As another example, the systems and methods can be arranged to include alert style notifications when an emergency vehicle is near, such as Amber alerts. Additionally or alternatively, the systems and methods can be available on drivers' mobile devices in form of applications.

Figure 3:
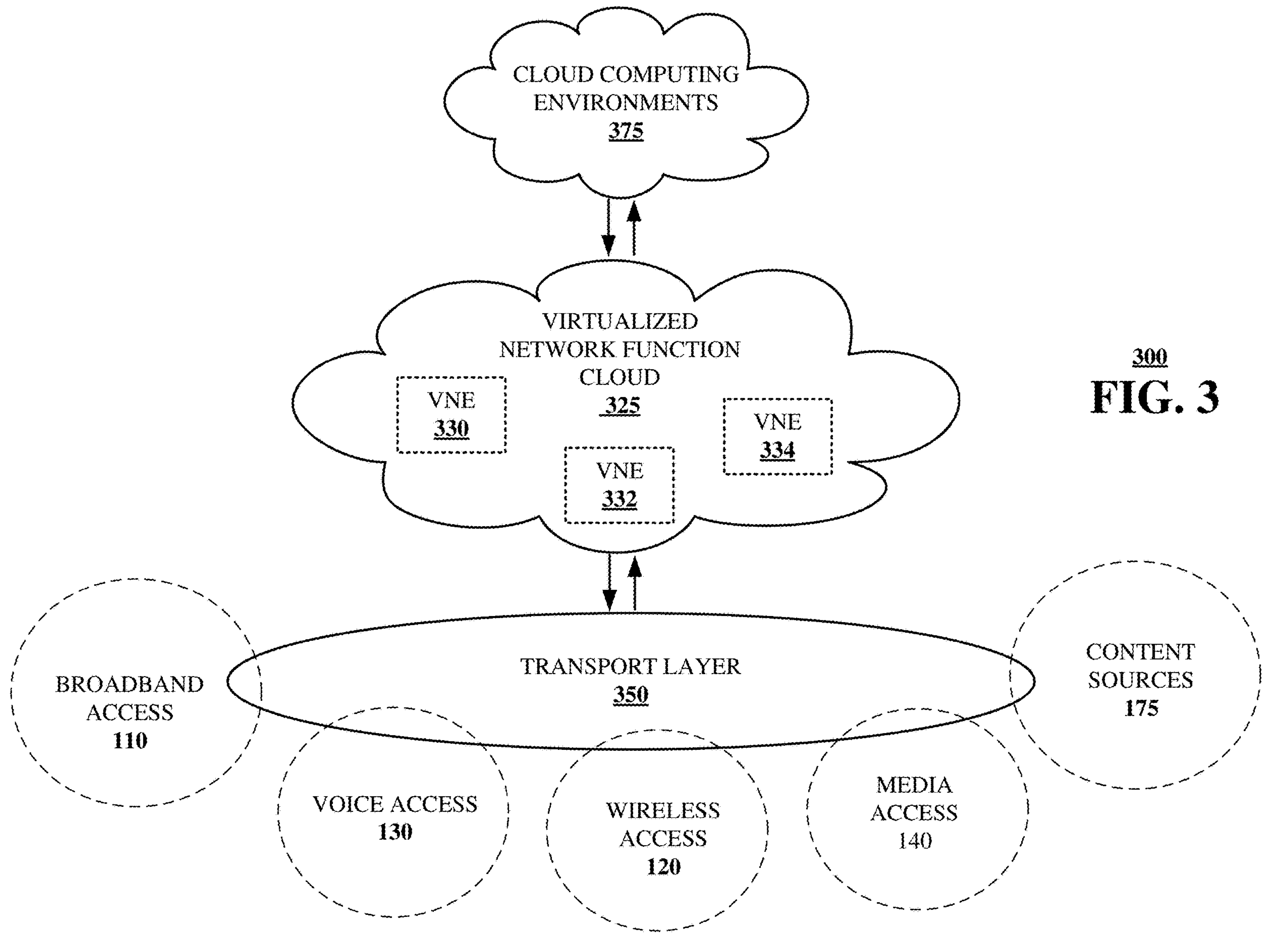
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. For example, virtualized communication network 300 can facilitate in whole or in part systems and methods for notifying drivers of real time events such as emergency events to trigger and facilitate an advance driver action.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
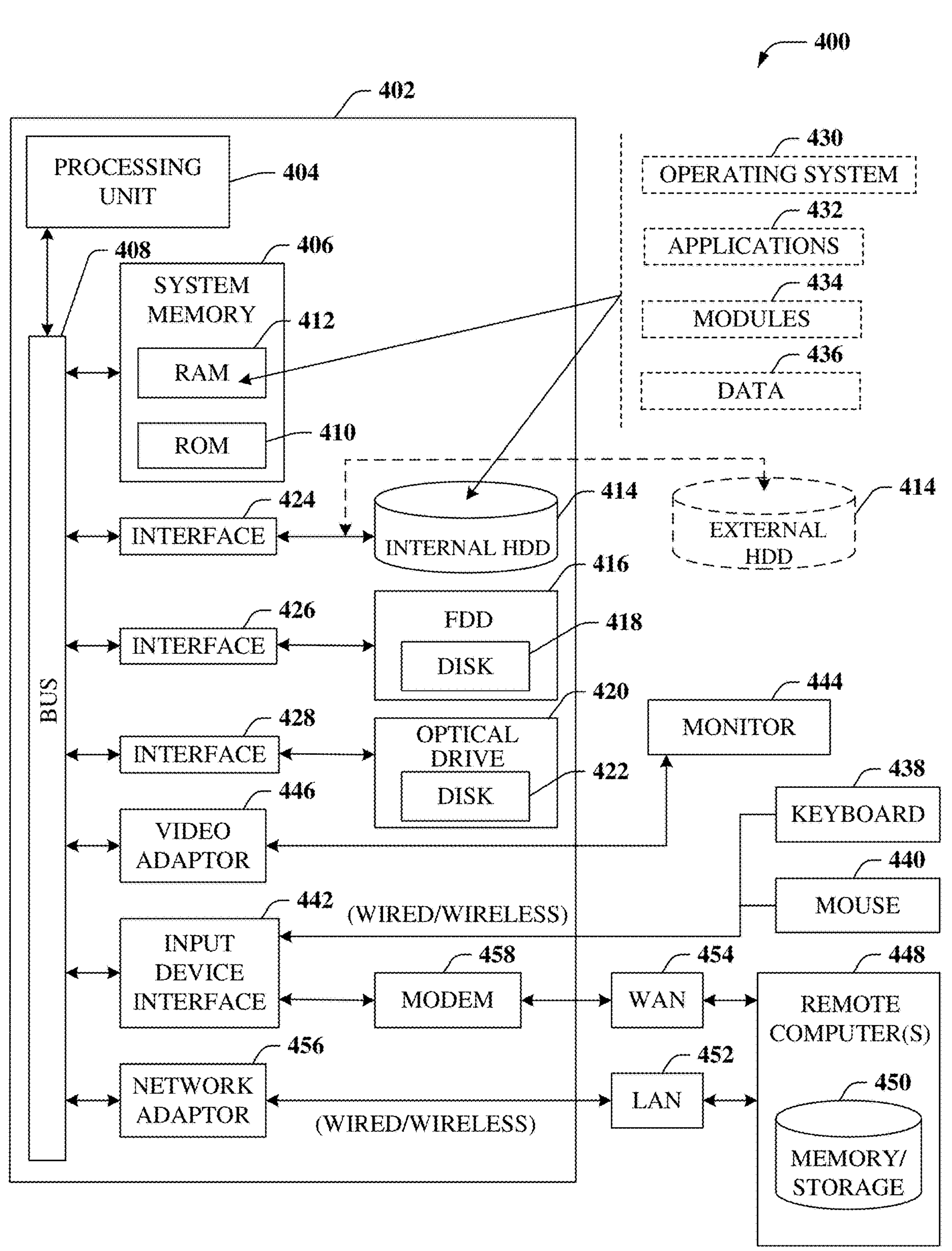
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part systems and methods for notifying drivers of real time events such as emergency events to trigger and facilitate an advance driver action.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
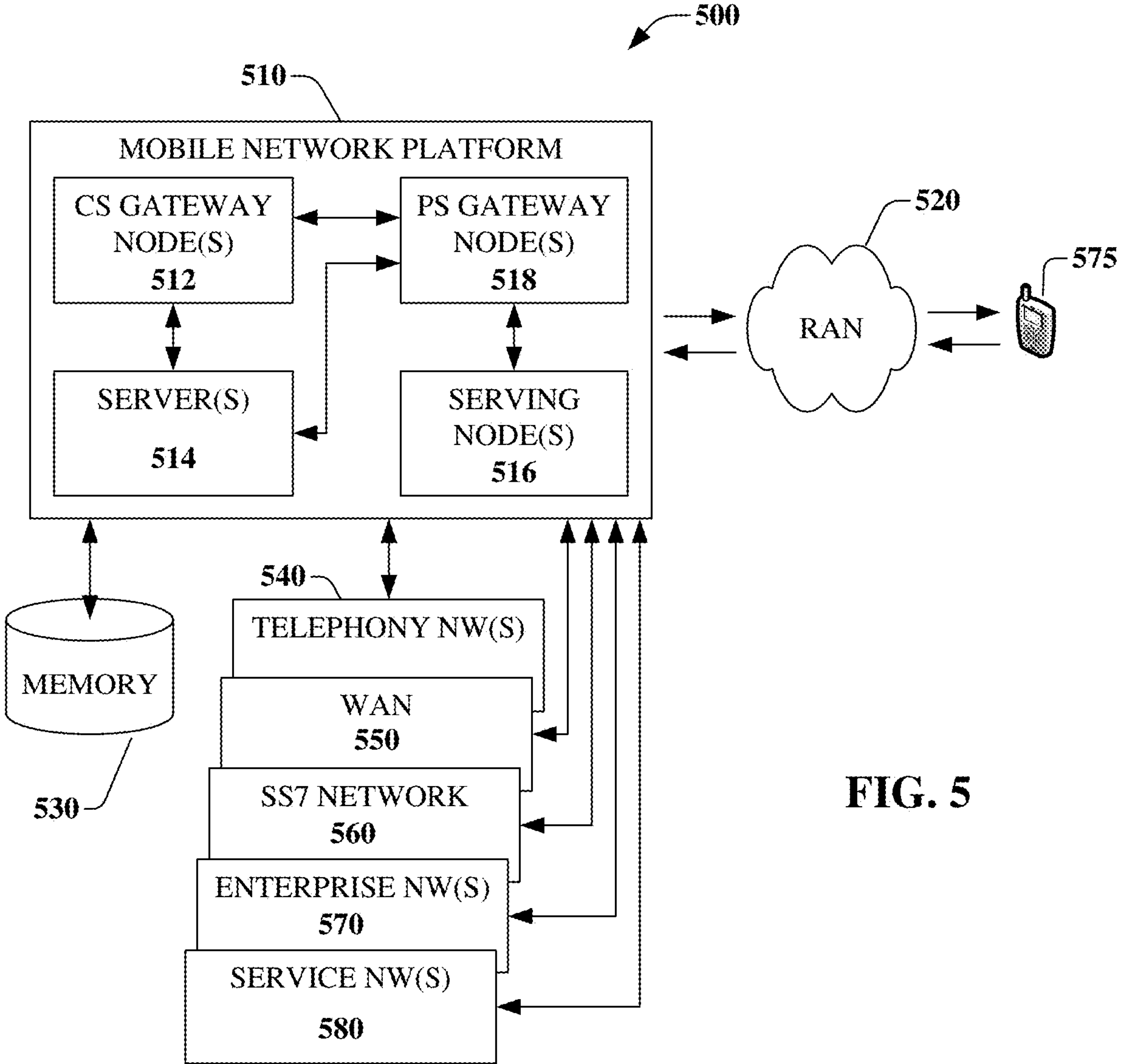
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part systems and methods for notifying drivers of real time events such as emergency events to trigger and facilitate an advance driver action. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
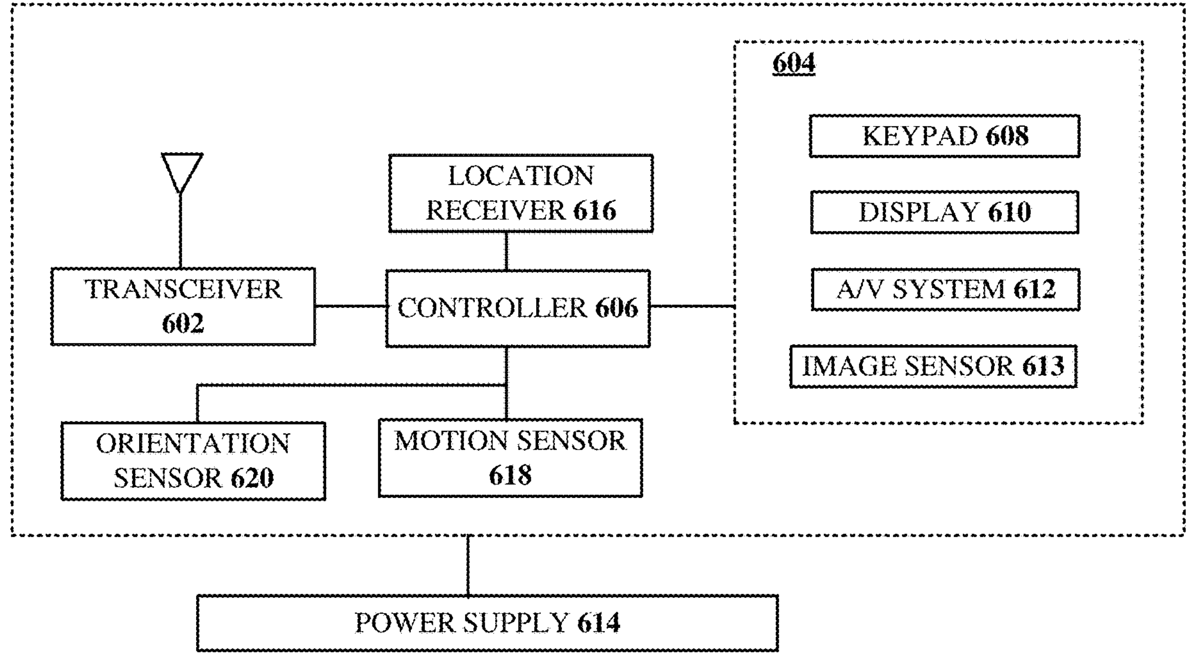
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part systems and methods for notifying drivers of real time events such as emergency events to trigger and facilitate an advance driver action.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising executable instructions that, when executed by a processing system including a processor, facilitate performance of operations, the operations comprising:

providing prioritized mobile network services to priority user equipment associated with emergency events, wherein the prioritized mobile network services comprise a reserved network capacity and high threshold bandwidth and are limited to an authenticated group of users;

providing subscription based mobile network services to subscriber user equipment, wherein:

the subscription based mobile network services enable the subscriber user equipment to receive real time information associated with the emergency events from the priority user equipment, and the providing the subscription based mobile network services further comprises facilitating the subscriber user equipment to transmit the real time information associated with the emergency events to another subscriber user equipment positioned within a predetermined proximity distance to the priority user equipment;

upon receiving the real time information, identifying a type of the priority user equipment and determining a distance to the subscriber user equipment and a direction approaching the subscriber user equipment; and based on the type of the priority user equipment and the direction approaching the subscriber user equipment, generating a near real time output via a user interface.

2. The non-transitory machine-readable medium of claim 1, wherein the generating the near real time output further comprises displaying a location of the priority user equipment approaching the subscriber user equipment on a navigation map.

3. The non-transitory machine-readable medium of claim 2, wherein the generating the near real time output further comprises generating a narration regarding a movement of the priority user equipment relative to the subscriber user equipment.

4. The non-transitory machine-readable medium of claim 1, wherein the generating the near real time output further comprises displaying a moving direction of the priority user equipment towards the subscriber user equipment on a navigation map.

5. The non-transitory machine-readable medium of claim 1, wherein the operations further comprise generating, via the user interface, an alert message indicating that the emergency event has ended.

6. The non-transitory machine-readable medium of claim 1, wherein the generating the near real time output further comprises:

displaying an icon of the priority user equipment and a moving direction of the priority user equipment relative to the subscriber user equipment; and generating an audio command describing a location of the priority user equipment relative to the subscriber user equipment.

7. A method, comprising:

providing, by a processing system including a processor, prioritized mobile network services to priority user equipment associated with emergency events, wherein the prioritized mobile network services comprise a reserved network capacity and high threshold bandwidth and are limited to an authenticated group of users;

providing, by the processing system, non-prioritized mobile network services to subscriber user equipment, wherein:

the non-prioritized mobile network services enable the subscriber user equipment to receive real time information associated with the emergency events from the priority user equipment, and the providing the non-prioritized mobile network services further comprises facilitating the subscriber user equipment to transmit the real time information associated with the emergency events to another subscriber user equipment positioned within a predetermined proximity distance to the priority user equipment;

upon receiving the real time information, identifying, by the processing system, a type of the priority user equipment and determining a distance to the subscriber user equipment and a moving direction approaching the subscriber user equipment; and based on the type of the priority user equipment and the moving direction approaching the subscriber user equipment, generating a near real time output via a user interface.

8. The method of claim 7, wherein the generating the near real time output further comprises displaying a moving location of the priority user equipment relative to the subscriber user equipment on a navigation map.

9. The method of claim 7, wherein the generating the near real time output further comprises generating an audio notification describing the moving direction of the priority user equipment approaching the subscriber user equipment using the subscriber user equipment as a reference point.

10. The method of claim 7, wherein the generating the near real time output further comprises generating an audio notification describing the type of the priority user equipment and the moving direction of the priority user equipment approaching the subscriber user equipment.

11. The method of claim 7, further comprising generating, via the user interface, an alert message indicating that the emergency event has ended.

12. The method of claim 7, wherein the generating the near real time output further comprises:

displaying a graphical icon of the priority user equipment and the moving direction of the priority user equipment approaching the subscriber user equipment; and generating an audio command describing the moving direction of the priority user equipment approaching the subscriber user equipment.

13. The method of claim 7, wherein the providing the prioritized mobile network services further comprises enabling the priority user equipment to activate or deactivate transmission of the real time information associated with the emergency events.

14. A system, comprising:

a processing system including a processor; and a memory that stores executable instructions that, when executed by the processing system, facilitate performance of operations, the operations comprising:

providing prioritized mobile network services to priority user equipment associated with emergency events, wherein the prioritized mobile network services comprise a reserved network capacity and high threshold bandwidth and are limited to an authenticated group of users;

providing subscription based mobile network services to subscriber user equipment, wherein the subscription based mobile network services enable the subscriber user equipment to receive real time information associated with the emergency events from the priority user equipment;

upon receiving the real time information, identifying a type of the priority user equipment and determining a distance to the subscriber user equipment and a direction approaching the subscriber user equipment; and based on the type of the priority user equipment and the direction approaching the subscriber user equipment, generating a near real time output via a user interface, wherein the generating of the near real time output further comprises:

displaying an icon of the priority user equipment and a moving direction of the priority user equipment relative to the subscriber user equipment; and generating an audio command describing a location of the priority user equipment relative to the subscriber user equipment.

15. The system of claim 14, wherein the generating the near real time output further comprises:

displaying a location and a moving direction of the priority user equipment approaching the subscriber user equipment on a navigation map; and generating a narration regarding a movement of the priority user equipment relative to the subscriber user equipment.

16. The system of claim 14, wherein the operations further comprise:

receiving a GPS signal representing a geographical location of the priority user equipment; and wherein the determining the distance to the subscriber user equipment further comprises determining that the geographical location of the priority user equipment is within a predetermined threshold distance to a location of the subscriber user equipment.

17. The system of claim 16, wherein the operations further comprise:

upon determination of proximity within the predetermined threshold distance to the subscriber user equipment, determining a moving direction of the geographical location of the priority user equipment relative to the subscriber user equipment, wherein the proximity varies as the priority user equipment, the subscriber user equipment or both move.

18. The system of claim 14, wherein the providing the subscription based mobile network services further comprises facilitating the subscriber user equipment to transmit the real time information associated with the emergency events to another subscriber user equipment positioned within a predetermined proximity distance to the priority user equipment.

19. The system of claim 14, wherein the operations further comprise generating, via the user interface, an alert message indicating that the emergency event has ended.

20. The system of claim 14, wherein the providing the prioritized mobile network services further comprises enabling the priority user equipment to activate or deactivate transmission of the real time information associated with the emergency events.

* * * * *